United States Patent
Barton et al.

(10) Patent No.: US 6,785,418 B1
(45) Date of Patent: Aug. 31, 2004

(54) IMAGE IDENTIFICATION APPARATUS AND METHOD OF IDENTIFYING IMAGES

(75) Inventors: Mark Barton, Bristol (GB); Jonathan Thorpe, Winchester (GB); Anne Cherrington, Reading (GB)

(73) Assignee: Sony United Kingdom Limited, Weybridge (GB)

( * ) Notice: Subject to any disclaimer, the term of this patent is extended or adjusted under 35 U.S.C. 154(b) by 617 days.

(21) Appl. No.: 09/658,326

(22) Filed: Sep. 8, 2000

(30) Foreign Application Priority Data

Sep. 9, 1999 (GB) .............................. 9921328

(51) Int. Cl.$^7$ ................................ G06K 9/18
(52) U.S. Cl. ................. 382/186; 345/173; 345/179; 345/181; 382/188; 382/189; 382/203; 382/305; 707/2; 707/6; 717/108; 717/109
(58) Field of Search ......................... 382/181, 185–190, 382/201–203, 305; 345/173–183; 707/2, 6; 717/106–109

(56) References Cited

U.S. PATENT DOCUMENTS

| | | | |
|---|---|---|---|
| 4,553,258 A | | 11/1985 | Chainer et al. |
| 4,975,975 A | * | 12/1990 | Filipski |
| 5,115,400 A | * | 5/1992 | Watanabe et al. ........... 700/182 |
| 5,742,280 A | * | 4/1998 | Ohyama ..................... 345/173 |
| 5,809,498 A | * | 9/1998 | Lopresti et al. ............... 707/6 |
| 5,832,474 A | * | 11/1998 | Lopresti et al. ............... 707/2 |
| 5,926,566 A | | 7/1999 | Wang et al. |
| 6,167,562 A | * | 12/2000 | Kaneko ....................... 717/109 |
| 6,259,043 B1 | * | 7/2001 | Clary et al. ............... 178/18.01 |
| 6,373,473 B1 | * | 4/2002 | Sakaguchi et al. .......... 345/173 |

FOREIGN PATENT DOCUMENTS

EP    0 567680    * 11/1883

OTHER PUBLICATIONS

Zhao R: "Incremental Recognition in Gesture–Based and Syntax–Directed Diagram Editors" Bridges Between Worlds. Amsterdam, Apr. 24–29, 1993, Proceedings of the Conference on Human Factors in Computing Systems. (Interchi), Reading, Addison Wesley, US, Apr. 24, 1993, pp. 95–100, XP000473757.

Tapper C C et al: "On–Line Handwriting Recognition –A Survey" Proceedings of the International Conference on Pattern Recognition. (ICPR). Rome, Nov. 14–17, 1988, Washington, IEEE Comp. Soc. Press, US, vol. 2 Conf. 9, Nov. 14, 1988, pp. 1123–1132, XP000013056 ISBN: 0–8186–0878–1.

Schomaker L: "From Handwriting Analysis to Pen–Computer Applications" Electronics and Communication Engineering Journal, Institution of Electrical Engineers, London, GB, vol. 10, No. 3, Jun. 1998, pp. 93–102, XP000870529 ISSN: 0954–0695.

* cited by examiner

*Primary Examiner*—Bhavesh M. Mehta
*Assistant Examiner*—Gregory Desire
(74) *Attorney, Agent, or Firm*—Frommer Lawrence & Haug LLP; William S. Frommer; Bruno Polito

(57) ABSTRACT

An image identification apparatus for identifying an image from a hand drawn representation of at least part of the image, the image identification apparatus comprising an image processor arranged in operation to generate a reference identification in response to spatial samples produced from at least part of the hand drawn representation, the reference identification being indicative of a first estimate of which of a plurality of pre-stored images corresponds to the hand drawn representation. and a controller which is arranged in operation to cause the image processor to produce a refined reference identification from the spatial samples and further spatial samples produced from a further part of the hand drawn representation, the refined reference identification being indicative of a refined estimate of which of the plurality of the prestored images corresponds to the hand drawn representation. The controller is arranged to operate with the image processor to generate further refined estimates of the identification of the image from subsequent hand drawn parts of the image.

21 Claims, 5 Drawing Sheets

----- = UNIT SQUARE BOUNDING BOX

× = CENTRE OF GRAVITY

× = MEAN VECTOR OF GESTURE

× = NORM. VECTOR OF GESTURE

Fig. 10(b)

| QUADRANT | NUMBER OF STROKE BEGINNINGS / ENDS |
|---|---|
| Upper left | 2 |
| Upper right | 2 |
| Lower left | 2 |
| Lower right | 2 |

IMAGE IDENTIFICATION APPARATUS AND METHOD OF IDENTIFYING IMAGES

BACKGROUND OF THE INVENTION

1. Field of the Invention

The present invention relates to image identification apparatus and methods of identifying images. More particularly the present invention relates to apparatus and methods for identifying images from hand drawn representations of the images.

2. Description of the Prior Art

There are many ways in which images may be created. Conventionally, an author or artist may draw a representation of the image using any appropriate means such as pencils, pens or other drawing equipment. An artist may also produce an image using a computer running a drawing application program which provides a facility for creating images and pictures by selecting pre-defined elements Such as boxes, lines and circles which may be positioned, sized and shaped using a computer mouse. Furthermore to reduce a time required to generate an image, the computer may be provided with a library of pre-generated images which may be selected and copied into a picture to produce a desired scene. The images may be for example parts of or complete pictures, designs for articles or representations of a scene of a play, television programme or film.

In the field of character recognition, images representing characters from an alphabet are recognised and the character from this alphabet is generated in response to input representations of those characters. An example of this is provided in a disclosure entitled "Neural Network Classifiers for Optical Chinese Character Recognition" by R. Romero, R. Berger, R. Thibadeau and D. Touretsky of the Imaging Systems Lab., Robotics Institute, Carnegie Mellon University published on the Internet at http://www-cgi.cs.cmu.edu. Furthermore the input representations may be hand drawn. In this case to assist in identifying the image, the hand drawn representation may be segmented into a number of different strokes of a pen which were performed in drawing the representation. This is disclosed in an article entitled "Pentip velocity in Handwriting", published on the Internet at http://hwr.nici.kun.nl/recog/hwr-tutor/veocity.html, copyright Lambert Schomaker, Apr. 1, 1996.

Generally it is desirable to provide a facility for generating an image from a hand drawn representation of the image in an efficient manner. This is appropriate, for example, during early stages of expressing ideas and initial thoughts for a picture, design or scene, where creative ideas are readily expressed as hand drawn representations.

SUMMARY OF THE INVENTION

According to the present invention there is provided an image identification apparatus for identifying an image from a hand drawn representation of at least part of the image, the image identification apparatus comprising an image processor arranged in operation to generate a reference identification in response to spatial samples produced from at least part of the hand drawn representation, the reference identification being indicative of a first estimate of which of a plurality of pre-stored images corresponds to the hand drawn representation, and a controller which is arranged in operation to cause the image processor to produce a refined reference identification from the spatial samples and further spatial samples produced from a further part of the hand drawn representation, the refined reference identification being indicative of a refined estimate of which of the plurality of the pre-stored images corresponds to the hand drawn representation.

It is possible to make an estimation of the identity of an image from a hand drawn representation of part of the image. As such by generating a reference identification indicative of a first estimate of which of a plurality of pre-stored images corresponds to the hand drawn representation, which may not be complete, and generating a refined reference identification following further spatial samples corresponding to further parts of the hand drawn representation of the image, a refined estimate of the identity of the hand drawn representation from the plurality of pre-stored images may be made. The control processor is arranged to operate with the image processor to generate further refined estimates of the identification of the image from subsequent parts of the hand drawn representation of the image. This provides a particular advantage in improving the efficiency with which an image may be produced from a hand drawn representation of the image in that by generating a first estimate of the image from the spatial samples produced response to the first part of the hand drawn representation, a first estimate of the image may be produced which may or may not correspond to the image desired. Therefore by continuing to draw a further part or parts of the image, or indeed revising a part already drawn, from which farther spatial samples are produced and generating the refined reference identification from an accumulation of the spatial samples and the further spatial samples, the refined estimate of which of the plurality of pre-stored images corresponds to the desired image may be produced from the more complete hand drawn representation or the image. This provides an improvement in a time taken to produce an image because a complete image may be formed from the pre-stored images, from a hand drawn representation of only part of the image. This is particularly advantageous for generating a scene which is made up of a plurality of the pre-stored images.

Although the spatial samples may be generated before being fed to the image identification apparatus, the image identification apparatus may preferably have a data store coupled to the image processor and to the control processor which serves to store at least one of the spatial samples and the further spatial samples. The control processor may be arranged in operation to feed at least one of the spatial samples and the further spatial samples to the image processor to generate the refined reference indication. The data store therefore stores the spatial samples corresponding to a particular hand drawn representation of the image. Further samples are then added to the data store as further parts of the image are drawn. In this way, spatial samples corresponding to the hand drawn representation of the image may be built up in the data store until enough samples are present to enable the correct image to be identified.

In a preferred embodiment the control processor may be arranged to receive a trigger signal in response to the part of the hand drawn representation being generated and the further part of the hand drawn representation being generated, the control processor being arranged in operation to communicate at least one of the spatial samples and the further spatial samples to the image processor in response to the trigger signal, so as to enable the refined reference identification to be generated. Although the image identification apparatus may operate continuously in that the apparatus may be arranged to continuously update the estimate of the image corresponding to the hand drawn representation of the image, by providing a trigger signal indicative of a completion of at least part of the hand drawn representation of the image, the control processor may generate an estimate of the image after a user has completed part of the image and from which the user would consider that the identification apparatus could sufficiently identify and distinguish the thus far hand drawn representation of the image from the plurality of pre-stored images.

Although the spatial samples corresponding to the hand drawn representation of the image may be pre-generated and stored before being fed to the image identification apparatus, advantageously the image identification apparatus may comprise a drawing processor having a drawing tool for use in creating the hand drawn representation of the image, the sequence of spatial samples being generated in accordance with the movement of the drawing tool. Furthermore the trigger signal indicative of completion of at least part of the hand drawn representation of the image may be provided by the drawing processor. In a preferred embodiment the drawing tool may be a pen means and a drawing surface, the trigger signal being generated by the drawing processor when the pen is substantially removed from the drawing surface. As such the image identification apparatus is provided with a particular improvement in that the user can efficiently add further parts of the hand drawn representation of the image, when the spatial samples so far produced are not sufficient to identify the image. In this way sufficient spatial samples may be established from which the image identification apparatus can identify the image. The user may then lift the pen from the drawing surface which is taken as the trigger signal that the image processing apparatus should form the next estimate corresponding to the refined reference identification of which of the plurality of the pre-stored images corresponds to the hand drawn representation of the image.

As an alternative to providing a trigger signal externally, the image identification apparatus may have a clock coupled to the control processor which serves to provide a temporal reference from which a predetermined time lapse from when the spatial samples and the further spatial samples were produced can be measured. The control processor may be arranged in combination with the image processor to generate at least one of the reference identification and the refined reference identification in response to the lapse of the predetermined time period. This alternative means for generating the reference identification and the refined reference identification therefore does not require a trigger signal and so the image corresponding to the spatial samples may be generated automatically without further user input.

In a preferred embodiment the image processor may comprise a segment processor arranged in operation to determine from the spatial samples or the further spatial samples stroke data representative of strokes performed in drawing the hand drawn representation of the image, a stroke pre-processor arranged in operation to generate parameter data by associating the sequence of spatial samples with the determined stroke data of the hand drawn representation and an image identifier coupled to the stroke pre-processor arranged in operation to generate the reference identification or the refined reference identification from the parameter data. Similarly in a preferred embodiment the image identification apparatus may comprise a visual display means coupled to the control processor and the data store may be arranged to store the plurality of pre-stored images. The control processor may be arranged in operation to retrieve from the data store image data representative of the image which corresponds to the hand drawn representation in accordance with at least one of the reference identification and the refined reference identification, and to display the image data on the visual display means.

As already explained, the trigger signal may be generated when a user lifts the pen from the drawing surface of the drawing tool. However in a further improvement, the image identification apparatus may further comprise a user interface device coupled to the control processor and arranged in operation to provide a user indication as to whether or not the corresponding image is in accordance with the hand drawn representation desired by the user. The corresponding image may then be saved in response to the user indication. The user interface device therefore provides a means to indicate to the control processor of the image identification apparatus that the image displayed on the visual display means is that which corresponds to the desired hand drawn representation of this image. In a further improvement in response to the user indication, the data store may be reset to receive spatial samples representative of a hand drawn representation of a further image. Therefore once the user indication has been received which indicates that the spatial samples and the further spatial samples which may have been added to complete further the hand drawn representation of the image and from which the estimate of the image is generated, these spatial samples are removed from the data store so that further spatial samples may be received which correspond to a further desired image. The user interface device may be for example a computer mouse, a key board or indeed may be provided by the drawing tool or any similar device.

According to an aspect of the present invention there is provided a method of identifying an image from a hand drawn representation of at least part of the image, the method comprising the steps of generating a reference identification from spatial samples produced in response to at least part of the hand drawn representation of the image, which reference indication is indicative of a first estimate of which of a plurality of pre-stored images corresponds to the hand drawn representation, generating a refined reference identification from the spatial samples and further spatial samples produced from a further part of the hand drawn representation, the refined reference identification being indicative of a refined estimate of which of the plurality of prestored images corresponds to the hand drawn representation and the further parts of the hand drawn representation.

Further aspects and features of the present invention are provided and illustrated with reference to the appended claims.

BRIEF DESCRIPTION OF THE DRAWINGS

Embodiments of the present invention will now be described by way of example only with reference to the accompanying drawings wherein.

DESCRIPTION OF A PREFERRED EMBODIMENT

Identifying an image from a hand drawn representation of the image is a process which finds application in several fields, such as image recognition and hand writing character recognition. For example generating an image from a hand drawn representation of the image can provide a way of universally communicating in that even if one does not speak a language within a country one can draw a desired article from which an image of the article can be produced and from which the appropriate word in that language can be searched. A further example application is in the form of handwriting recognition in which characters of an alphabet are identified from hand drawn or written representations. Similarly for example a facility for generating an image from a hand drawn representation of that image can provide an efficient way of generating a complicated scene for a picture or illustration using a plurality of more complicated but pre-stored images. An example application to illustrate and facilitate understanding of an example embodiment of the present invention is a story board generation station which provides a means for artists to generate a story board representation of a scene for a film, advertisement, documentary or the like. As will be appreciated, the story board production station according to an example embodiment of the present invention is provided with a particular advantage in that persons who are not provided with a particular ability and skill at drawing may generate accurate and complex visual representations of story boards regardless of artistic ability. An example embodiment of the present invention is shown in FIG. 1 which provides an illustration of the story board production station.

Figure 1:
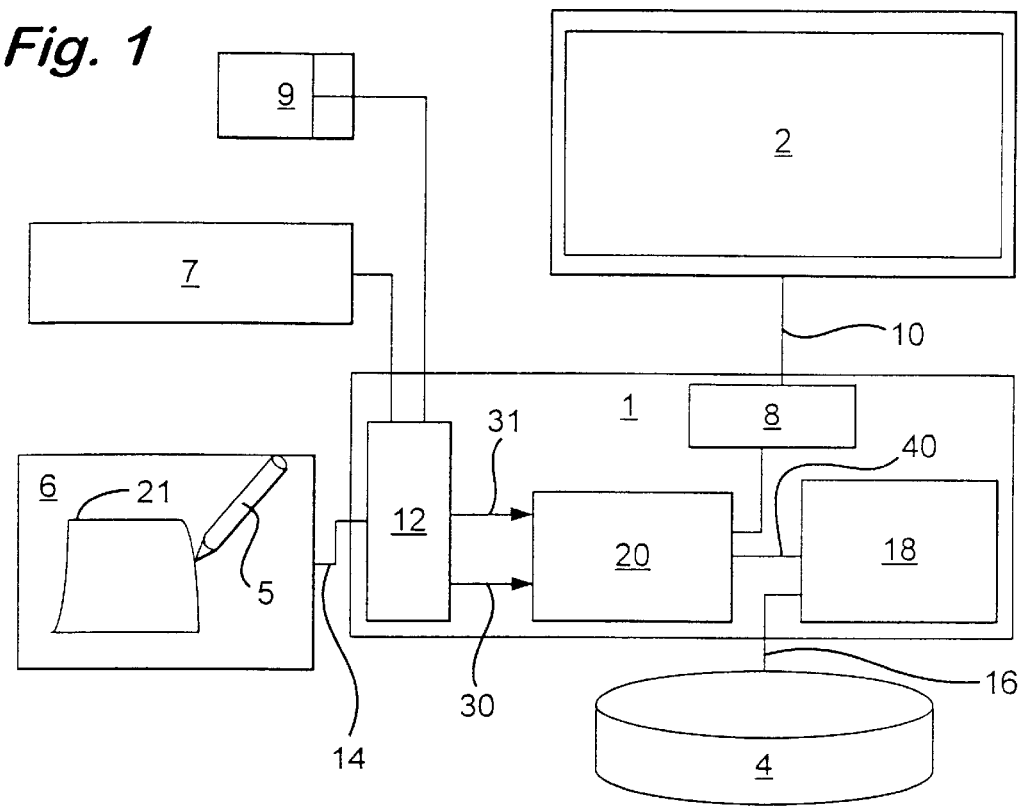
FIG. 1 is a schematic block diagram of a story board generation station.

In FIG. 1 the story board editing station is shown to comprise a data processor 1, a visual display unit 2, a data store 4 and a pen and tablet drawing tool 6. The visual display unit 2 is connected to a visual display unit (VDU) driving processor 8 within the data processor 1 via a connecting channel 10. The pen and tablet drawing tool 6 is connected to an interface processor 12 within the data processor 1 via a conductor 14. Also connected to the interface processor 12 is a keyboard 7 and a computer mouse 9. The data store 4 is connected to a data store access processor 18 via a conductor 16. The VDU graphics driver 8, the interface processor 12 and the data store access processor 18 are all coupled to a control unit 20 within the data processor 1. The control unit 20 controls the operation of the story board editing station by controlling the data store 4, the visual display unit 2 and by processing information received from the drawing tool 6. A better understanding of the operation of the story board editing station shown in FIG. 1 may be gathered from a more detailed explanation of the control processor 20, which will be provided in the following paragraphs with reference to FIG. 2 which provides an example embodiment of the control processor 20.

Figure 2:
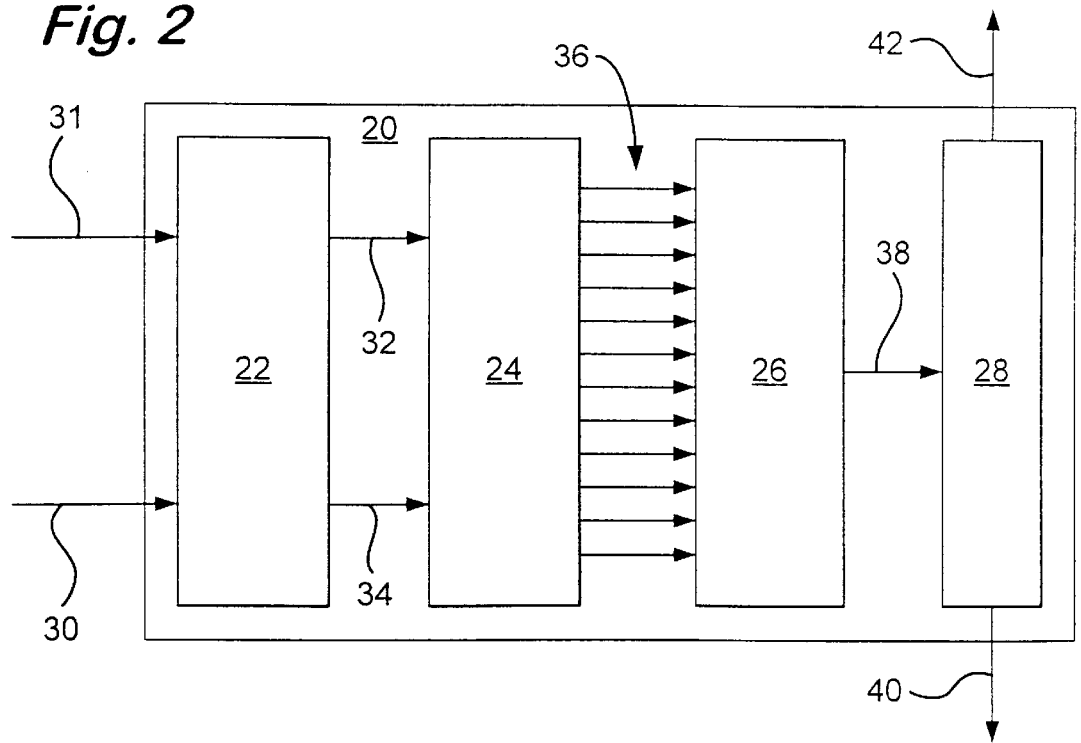
FIG. 2 is a schematic block diagram of a control unit which appears within a data processor of the story board station shown in FIG. 1.

In FIG. 2 the control processor 20 is shown to comprise a segment processor 22, a stroke pre-processor 24, an image identifier 26 and an interface controller 28. As illustrated in FIG. 1, a representation of a square 21 has been drawn by a user of the editing station using the pen 5 on the tablet of the drawing tool 6. From this drawing spatial samples are produced which are provided with a temporal reference. The spatial samples provide discrete samples of the co-ordinates of the pen within an x, y plane formed by the tablet of the drawing tool 6. The segment processor 22 receives data representative of the temporally referenced spatial samples from the drawing tool 6 from an input channel 30. As will be explained in more detail shortly, the segment processor processes the temporally referenced spatial samples and generates from these samples data representative of a number of different strokes which were used in producing a hand drawn representation of an image. This data which will be generally referred to as stroke data is then fed to the stroke pre-processor 24 via a conductor 34. The temporally referenced spatial samples of the hand drawn representation which were received from the connecting channel 30 are then fed to the stroke pre-processor via a second connecting channel 32. The stroke pre-processor 24 operates to combine the stroke data with the temporally referenced spatial samples to form a predetermined set of parameters which are representative of and describe the strokes which were used to produce the hand drawn representation of the image. In the example embodiment shown in FIG. 2, twelve stroke parameters are generated although it will be appreciated that any number of stroke parameters could be used. Data representative of each of the twelve stroke parameters termed stroke parameter data are then fed via one of twelve separate parallel conductors 36 to the image identifier 26.

The image identifier 26 receives a set of stroke parameter data from the parallel conductors 36 for each hand drawn representation of an image produced on the drawing tool 6 by a user of the story board editing station. The image identifier 26 processes the stroke parameter data and produces a reference indication which may be a series of digits indicative of which of a plurality of images corresponds most closely to the stroke parameter data. The reference indication is produced at an output conductor 38 and fed to the interface processor 28. The interface processor 28 is connected via a first bi-directional connecting channel 40 to the data store access processor 18 and via a second connecting channel 42 to the VDU driving processor 8. The data store access processor 18 accesses the data store and retrieves image data representative of one of the plurality of images stored in the data store 4. The image data selected by the data store access processor 18 corresponds to one of the plurality of pre-stored images which corresponds to the reference indication generated by the image identifier 26. The image data is fed via the connecting channel 40 to the interface control processor 28. The interface control processor 28 then feeds the image data to the VDU driver processor 8 via the connecting channel 42. The VDU driving processor 8 operates to convert the image data into signals for driving the visual display unit 2. The signals are fed via the connecting channel 10 to the visual display unit 2 which serves to display the image selected from the data store 4 to the user of the story board editing station.

A better appreciation and understanding of the operation of the control processor 20 may be gathered from a more detailed explanation of the function of the segment processor 22, the stroke pre-processor 24 and the image identifier 26 provided in the following paragraphs. As already explained the drawing tool 6 operates to produce temporally referenced spatial samples in accordance with the movement and position of the pen 5 of the drawing tool 6 which are produced for the hand drawn representation of the image. These temporally referenced spatial samples could be generated in any convenient way such as using the computer mouse 9, the keyboard 7 or any tool which allows an author to draw a representation of the desired image and to from which spatial samples can be produced. In the example embodiment of the present invention the drawing tool 6 has a pen 5 which when drawn on the tablet 6 produces the temporally referenced spatial samples in accordance with the movement of the pen 5. An example of such a pen and tablet drawing tool is produced by a company known as Wacom. More information of such pen and tablet products may be found at the web address www.wacom.com.

Figure 3:
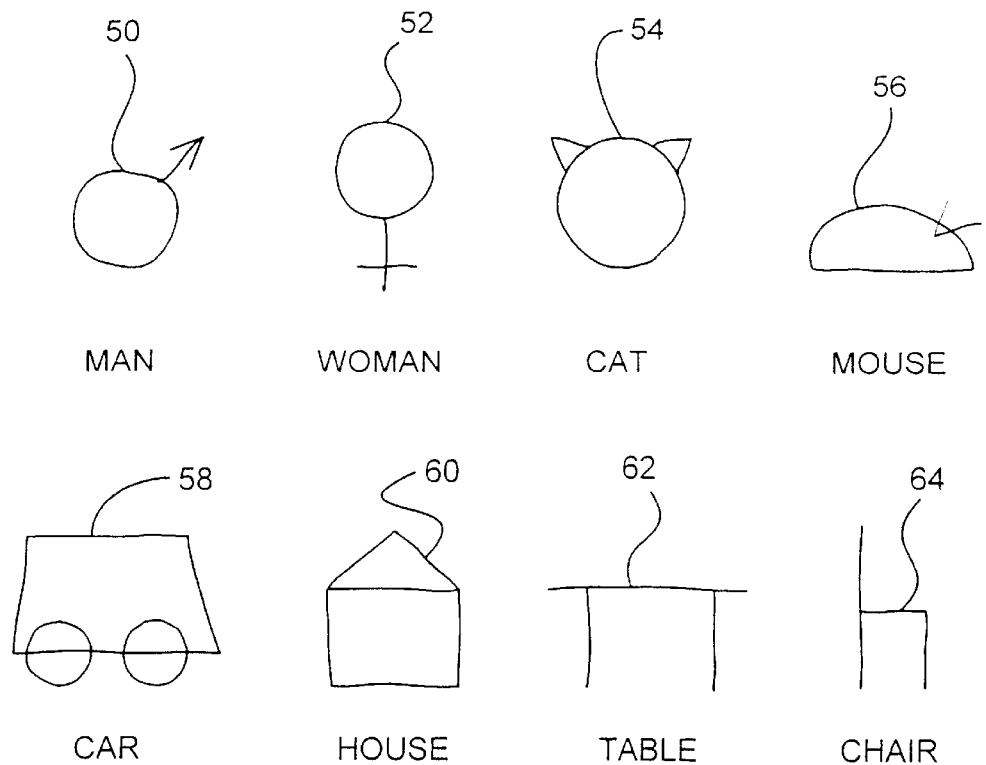
FIG. 3 is an illustrative representation of eight example hand drawn representations of images.

Using the pen and tablet arrangement, the user of the editing station shown in FIG. 1 may draw representations of the images which are required to build a scene for a story board. Examples of such images are shown in FIG. 3. In FIG. 3 the examples given of hand drawn representations of images include a man 50, a women 52, a cat 54, a mouse 56, a car 58, a house 60, a table 62 and a chair 64. Some of these examples of gestures which would be useful in a story boarding environment can be drawn in a single stroke. However others of these gestures are "multi-stroke", which means that several individual pen actions are typically required to produce these hand drawn representations corresponding to the images. Such hand drawn representations or parts thereof are referred to in the following paragraphs as gestures.

As an illustrative example of the operation of the control processor 20, the representation of the square 21 drawn by the user as shown in FIG. 1 will be used to illustrate the operation of the control processor 20. In order to identify images from hand drawn representations of these images, the control processor 20 operates to identify a set of pen strokes which are formed by the user to draw the representation.

These pen strokes may be identified from a process known as stroke capture and segmentation of the hand drawn representations from which the stroke data is produced. The spatial samples are then pre-processed in accordance with the stroke data and parameter analysis of the hand drawn representation produces parameter data. The hand drawn representation is then identified from the parameter data. Each of these three steps is performed respectively by the segment processor 22, the stroke pre-processor 24 and the image identifier 26.

Figure 4:
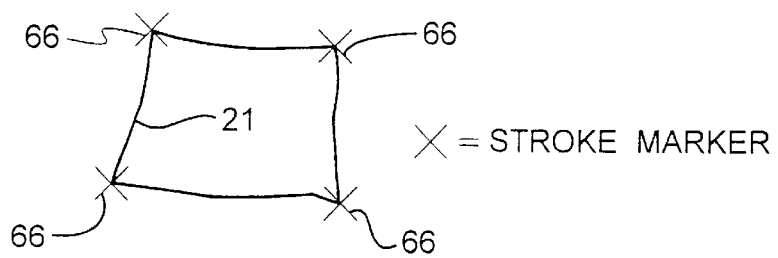
FIG. 4 is an illustration of a hand drawn representation of a square.

In FIG. 4 the hand drawn representation of the square 21 is shown with reference to stroke markers 66. These stroke markers 66 are produced by the segment processor 22, during the first step of stroke capture and segmentation, by analysing the temporally referenced spatial samples to identify the start and end of strokes of the pen 5. To perform stroke capture and segmentation the segment processor 22 of preferred embodiments, which is shown in more detail in FIG. 5. operates to identify the strokes which make up the hand drawn representation using one or both of two analysis processes.

Figure 5:
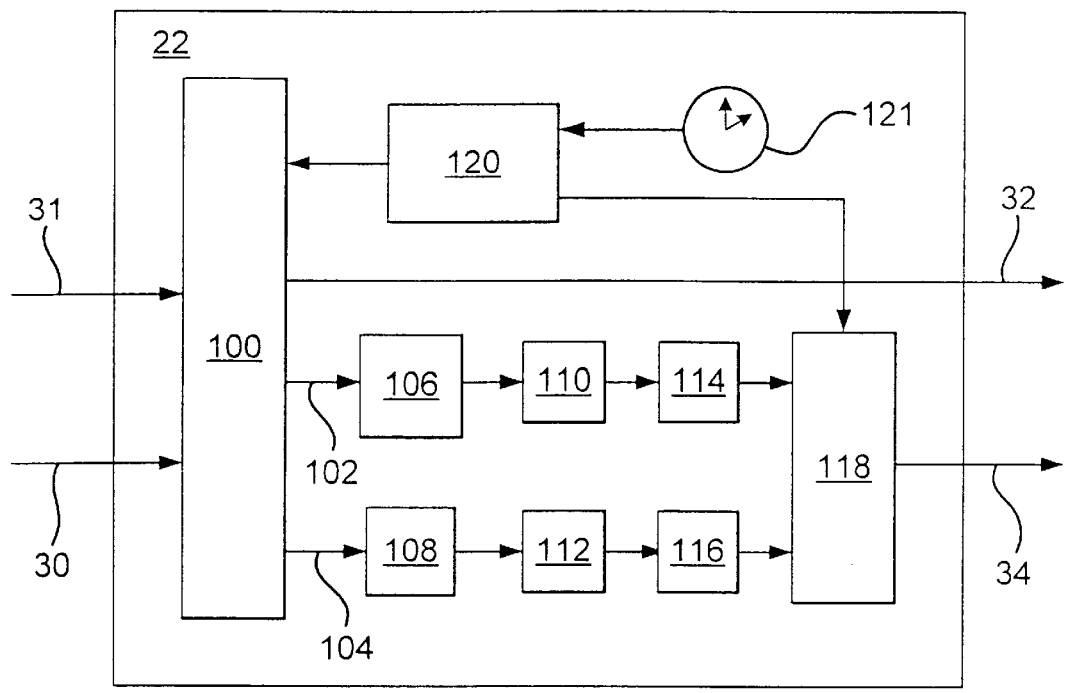
FIG. 5 is a schematic block diagram of a segment pre-processor which is shown in FIG. 2.

As shown in FIG. 5, the segment processor 22 is shown to comprise a cache memory unit 100, which is arranged to receive the spatial samples from the drawing tool 6 via the connecting channel 30 from the interface processor 12. Connected to the cache memory unit 100 via first and second output conductors 102, 104 is a direction processor 106 and a speed processor 108. Connected to the direction processor 106 and the speed processor 108 are first and second low pass filters 110, 112 respectively. Connected to an output of each of the low pass filters 110, 112 is a first and a second segment estimator 114, 116. Connected to an output of the first and the second segment estimators 114, 116 is a segmenter 118 which operates to produce at the connecting conductor 34 the stroke data which serves to identify the strokes which were used to drawn the hand drawn representation of the image. The segment processor 22 is also provided with a controller 120 which is connected to the cache memory unit 100 and the segmenter 118 and serves to control the operation of the segment processor.

The segment processor 22 operates to identify the strokes which were used to generate the hand drawn representation of the image, and to generate the stroke data identifying these strokes which includes the start and end point of the strokes. The two processes by which the strokes of the hand drawn representation may be identified are based on a relative direction of the pen 5, and an analysis of the relative speed of the pen 5. After a trigger signal is received, the controller 120 operates to read the spatial samples out from the cache memory unit 100. This trigger signal can be provided in a 5 number of different ways. For example, the drawing tool 6 can be arranged to generate a signal which indicates that the pen 5 has left the drawing tablet of the drawing tool 6. This is detected by the interface processor 12 and accordingly generates a trigger signal on the control channel 31. A further example would be if the user entered a pre-determined key from the keyboard 7 or a command signal from the mouse 9. These signals can also be detected by the interface processor 12 and used to generate the trigger signal on the input channel 31. A further example would be to produce a trigger signal from the controller 120 within the segment processor 22. This could for example be produced after a pre-determined amount of time has lapsed from receiving the last spatial samples within the cache memory unit 100. To measure this time lapse, a clock 121 is provided within the segment processor which provides a temporal reference for the controller 120.

Figure 6:
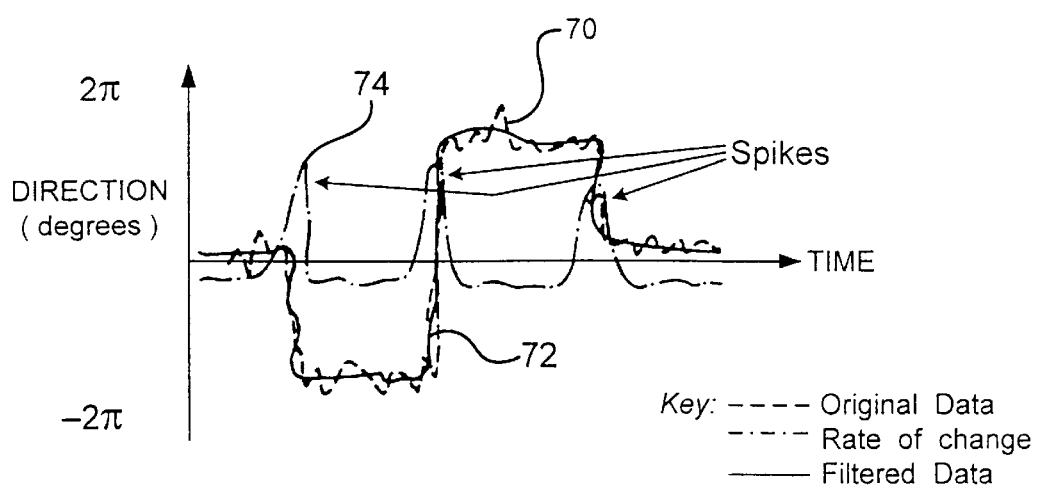
FIG. 6 presents a graphical representation of a plot of direction of a drawing tool with respect to time, FIG. 7 provides a graphical representation of a plot of speed of a drawing tool with respect to time, FIG. 8 provides a graphical representation of a hand drawn square in a unit square.

Having received the trigger signal, the controller 120 feeds the spatial samples from the cache memory 100 to the direction processor 106 and the speed processor 108. The direction processor 106 operates to identify the strokes used in producing the hand drawn representation by analysing the spatial samples. This analysis produces data representing a plot of the relative direction of travel of the pen with respect to time. For the example of the hand drawn representation of the square 21, a result of this analysis is illustrated in FIG. 6. In FIG. 6 a graphical representation of the direction of the pen 5 as the pen moves in drawing the square 21 is shown with respect to time. This is represented by the broken line 70.

It is possible for the user to draw a gesture in either one pen action or many actions. For the example of the hand drawn representation of the square 21, four strokes are used to make up this image. This is made up from four straight lines, which could be drawn in four separate pen actions or drawn as one continuous action. The stroke capture and segmentation process is made to be invariant to the number of actions required to draw a particular gesture, which has a fixed number of strokes. The stroke capture and segmentation process can use either a relative direction analysis or a relative speed analysis, or as in the example embodiment presented in FIG. 2, use both relative direction and speed analysis.

The cached spatial samples which represent the hand drawn image are taken and an assumption made that at corners, such as those in the square 21, there will be a detectable shift in the direction in which the pen is travelling. Depending on the amount of data available for the gesture, the direction for each pixel is calculated using n pixels before and after the current pixel to reduce noise which may be present in the gesture. This is represented by the broken line 70, which provides a representation of the data generated at the output of the direction processor 106. This relative direction data is then passed through the first low pass filter 110. Which removes noise. The filtered relative direction data is represented in FIG. 6 as a solid line 72. The filtered relative direction data is then fed to the first segment estimator 114, which determines a rate-of-change of the relative direction of the pen 70. This is represented in FIG. 6 as a second broken line made up from dots and dashes 74. Because the direction in which the pen is travelling will change rapidly at corners, the rate-of-change of direction will spike at these points. This can be seen in FIG. 6 from the second broken line 74, which has spikes 75. These spikes 75 are detected by the first segment estimator, which in the example of the hand drawn representation of the square 21, corresponds to three changes in direction representing four strokes.

Figure 7:
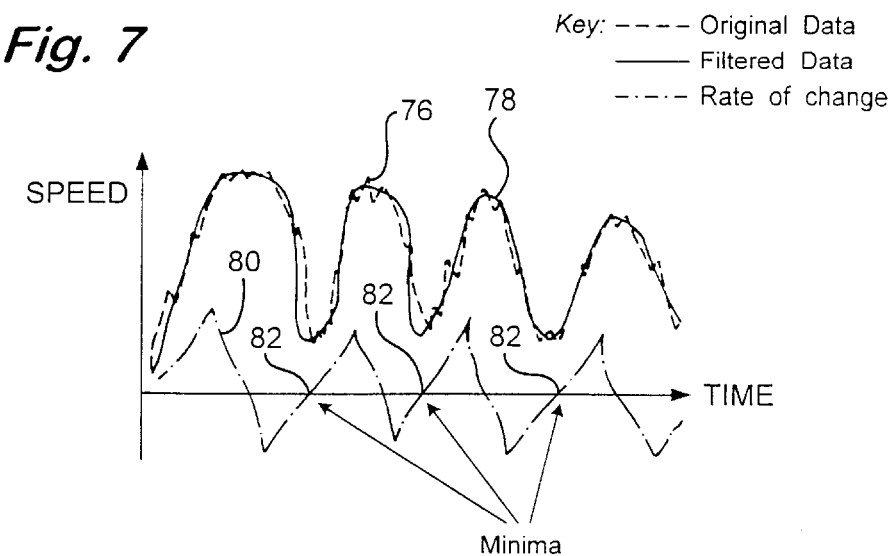

The speed processor 108, on the other hand, produces an estimation of the number of strokes and the start and end points from a relative change in speed of the pen 5. The speed processor 108 analyses the spatial samples received from the cache memory unit 100, and produces data representative of a relative speed of the pen. This is illustrated in FIG. 7, in which a graphical representation of the speed of the pen 5 as the pen moves to draw the square 44 is represented as a broken line 76. To detect the strokes which make up a hand drawn representation of an image, an assumption is made that when the user draws a gesture such as the square 21 the speed at which the pen is moving will reduce significantly at the four corners allowing the corners, and therefore the end points of each stroke, to be detected. The speed data produced by the speed processor and representative of the first broken line 76 shown in FIG. 7 is filtered to remove noise. The filtered speed data is represented by the solid line 78. The filtered speed data is then passed to the second segment estimator 116, which generates data representative of the rate-of-change of the speed. From this, zero crossing points are detected. At the zero crossing points the second differential is calculated to determine whether or not the zero crossing is a minimum or maximum, with minima corresponding to a positive second differential. If a zero crossing point corresponds to a minimum then a stroke has been located. This is represented in FIG. 7 by the zero crossing points 82, which correspond to points at which the pen decelerates at the corners of the square 21.

The estimates of the strokes which make up the hand drawn representation are fed from the first and second segment estimators 114, 116 to the segmenter 118. The segmenter 118 processes the estimates from the relative direction analysis and the speed analysis, which are compared and combined and a list produced of the locations where the gesture should be segmented into separate stokes. The segmentation into strokes is then performed from which the stroke data is produced at the connecting channel 34 which is fed to the stroke pre-processor 24. Also fed to the stroke pre-processor 24 from the cache memory unit 100 via the connecting channel 32 are the spatial samples which corresponds to the hand drawn image.

Figure 8:
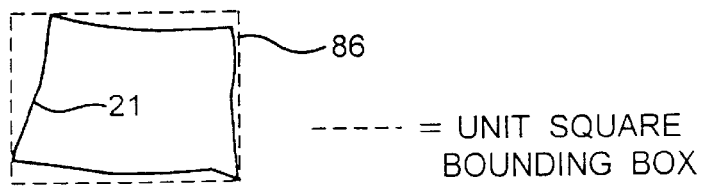

Returning to FIG. 2, the temporally referenced spatial samples and the stroke data are received by the stroke pre-processor 24. The stroke pre-processor 24 operates to calculate values for twelve pre-determined parameters. In order to calculate these parameter values, the hand drawn representation produced in accordance with the gesture is normalised with reference to a pre-determined boundary, which in the example embodiment is a unit square. The gesture is normalised by scaling the coordinates so as to fit inside the unit square bounding box. This normalisation is illustrated in FIG. 8, in which the hand drawn representation of the square is shown with reference to the unit square bounding box represented by a broken line 86.

The values for the pre-determined parameters are then calculated by the stroke pre-processor 24 using the normalised gesture to produce the parameter data. The parameters used in the example embodiment are as follows:

(1) Number of strokes—a single parameter, (2) Centre of gravity of the gesture—x, y co-ordinate,—two parameters (3) Mean vector of the gesture—x, y co-ordinate,—two parameters (4) Normalised vector of the gesture—x, y co-ordinate,—two parameters (5) Length of the gesture—a single parameter, and (6) Balance of the gesture—four parameters.

Figure 9A:
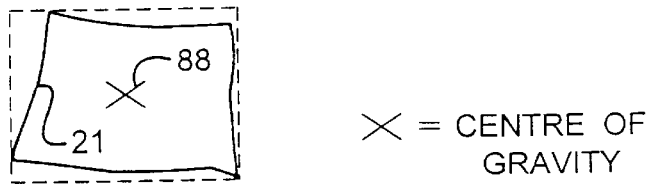
FIG. 9 provides an illustrative representation of the stroke parameters for the hand drawn representation of the square shown in FIG. 8 for (a) the centre of gravity (b) the mean vector, and (c) the normalised vector, FIG. 10 provides an illustrative representation of (a) the balance of the hand drawn representation of a square and (b) a table providing the number of stroke beginnings and ends for the balance of the square.
Figure 9B:
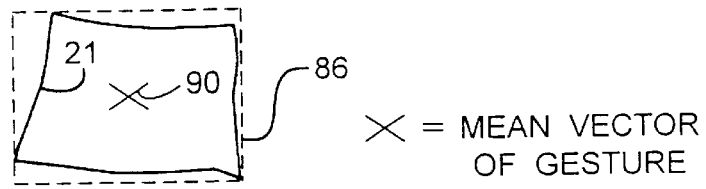
Figure 9C:
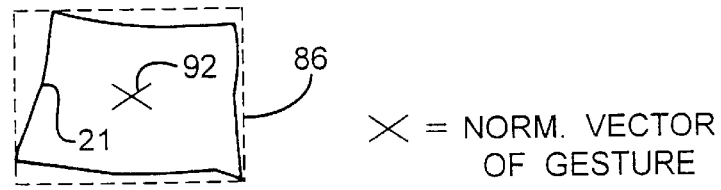
Figure 10A:
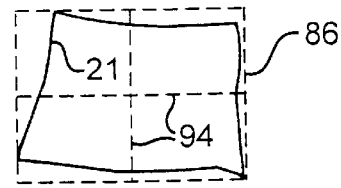

These parameters are illustrated in FIG. 9. The parameter for the number of strokes is self-explanatory and is in effect determined by the segmentation processor 22. The centre of gravity of the gesture is calculated by summing, the normalised co-ordinates for each pixel and dividing the result by the number of pixels. An example of this is shown in FIG. 9(*a*) in which the square 21 is shown with reference to the bounding box 86 with a cross 88 indicating a centre of gravity of the square 21. The mean vector of the gesture is calculated by summing the vector between each stroke start and finish and dividing the result by the number of strokes. An example of this is shown in FIG. 9(*b*) where a cross 90 indicates the mean vector of the gesture which defines the square 21. The parameter of the normalised vector is very similar to the parameter for the mean vector, but differs in that before the normalised vector is calculated it is normalised with respect to the centre of gravity such that it is determined in a clockwise direction around the centre of gravity. An example of this is shown in FIG. 9(*c*), in which a cross 92 provides an indication of a representation of the normalised vector. The length of the gesture is calculated by summing the distance between normalised pixel point of the gesture. The balance of the gesture is formed by dividing the unit square that bounds the normalised gesture into four quadrants. Each stroke is then examined to identify in which quadrant its beginning and end points lie. A count is then formed of the number of stroke ends in each quadrant. In FIG. 10(*a*), the square 21 is shown with reference to a dividing grid represented by broken lines 94. From the dividing grids the balance of the gesture is calculated and this is represented in the table shown in FIG. 10(*b*).

Figure 11:
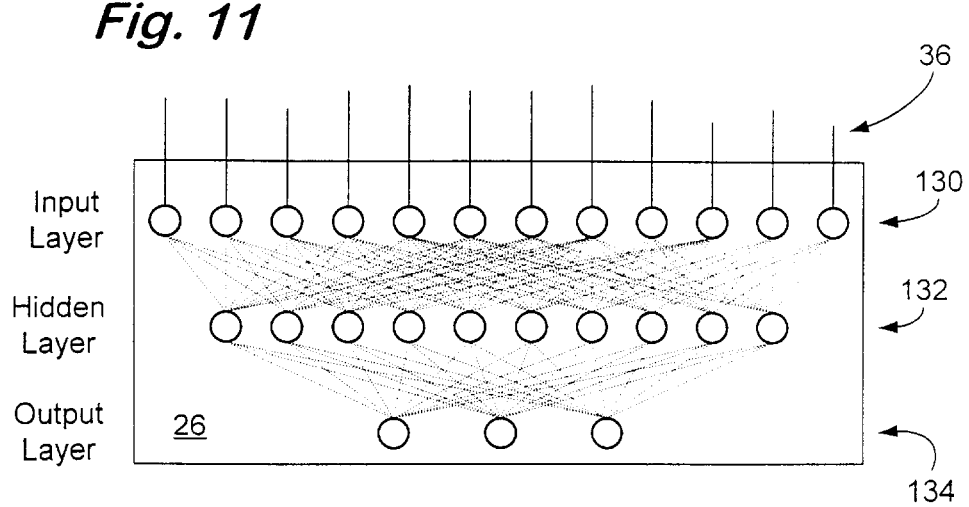
FIG. 11 is a schematic diagram representing a neural network.

Returning to FIG. 2, the twelve parameter values are fed via the parallel conductors 36 to the image identifier 26 which generates the reference indication in accordance with a most likely correspondence of the reference indication with the twelve parameter values. In FIG. 11 the image identifier 26 is shown in more detail to comprise a series of neurones in three layers which are represented as rows which forms a neural network. Neural networks are known to persons skilled in that art, although more detail is provided in a published article by D. E. Rumelhart, J. L. McClelland and the PDP Research Group (Eds.). entitled "Parallel Distributed Processing: Explorations in the Microstructure of Cognition. Volume 1: Foundations, published in 1988 by Cambridge MA: MIT Press and reprinted in Anderson and Rosenfeld. The neural network of the example embodiment is a multi layer perception network with twelve neurones in the input layer 130 corresponding to the twelve stroke parameters, and a hidden layer 132 consisting of ten neurones. The twelve parameters are shown connected to the twelve input neurones by the parallel conductors 36. The neurones are interconnected to form the neural network, an output layer 134 beings provided which serves to generate the reference indication of the image which corresponds to the hand drawn representation. For the example embodiment the three outputs from the neural network can classify up to eight different hand drawn images, although it will be appreciated that other numbers of images may be classified with a corresponding number of outputs. Training the network is performed off-line. This task for the example embodiment takes in the order of fifteen minutes with a training set consisting of twenty examples of each gesture from fifteen users. This corresponds to two thousand four hundred individual gestures. This represents an amount of training data required to achieve good recognition rates for any user. Preferably sufficient training data should be provided from a diverse enough range of users to train the network. However the image identifier produced according to the example embodiment is directionally invariant. For example, if a straight horizontal line is drawn as a gesture, the image identifier does not distinguish whether the line is drawn from left to right or from right to left. Directional invariance provides an advantage in that the same gesture may be drawn in a number of different stroke orders, however this precludes gestures that contain directional information.

The operation of the story board editing station shown in FIG. 1 may know be more easily understood from the foregoing explanation. In order to produce a story board an editor can draw a representation of the desired image using the drawing tool 6. The data processor 1 then processes the hand drawn representation and retrieves an image which best corresponds to the hand drawn representation and displays this on the VDU 2. By executing appropriate commands from either the keyboard 7 or the computer mouse 9, the data processor 1 can save and position the image within the screen presented by the visual display unit 2 at a desired location. The user then continues to draw other representations of the images which are retrieved from the data store and produced on the screen of the VDU. The user may correspondingly position and save the produced image at a desired location so that a scene of the story board may be produced.

A further advantage is provided to the example embodiment of the present invention by detecting when the pen 5 has left the tablet of the drawing tool 6. As already explained this is one way in which the trigger signal to indicate that the gesture forming the hand drawn representation of the image should be processed by the image identifier. When the pen 5 has left the tablet 6, the control unit immediately processes the last gesture produced and retrieves the image corresponding to this gesture form the data store 4 to be displayed on the visual display unit 2. When the image is displayed on the visual display unit 2, the user may confirm that this is the correct image by introducing commands using the keyboard 7 or the computer mouse 9 the interface processor 12 then producing control signals on conductor 31 to clear the cache memory unit 100. However if the user continues to draw using the pen 5 of the drawing tool 6, the control unit 20 adds the new spatial samples of the new gesture to those already held in the cache memory representing the previous gesture or gestures of the hand drawn representation. When the trigger signal is produced, the controller 120 in the segment processor 22 again produces the stroke data and the spatial samples, so that the control unit 20 operates to make a further estimate of the image which is representative of the hand drawn representation. In this way as soon as the correct image is found and presented on the visual display unit 2 the user can confirm and use this image without a requirement to complete the drawing of the hand drawn representation of this image. This therefore provides a further expedient and efficient way of generating a story board.

As will be appreciated by those skilled in the art, although the example embodiment of the present invention has been described with reference to a story board editing station, it will be appreciated that the present invention finds application in other fields, for example a universal communicator. Thus without any knowledge of a language in a country, a user may draw a representation of an object which is desired to be communicated. This further provides a means for shopping and communicating using hand drawn representations of images.

It will be appreciated that those parts of the image identification apparatus implemented as hardware could be equivalently implemented as a software computer program or computer programs being executed on an appropriate data processor. Similarly, those parts which are implemented as computer programs could equivalently be implemented as a hardware processor. As such it will be appreciated that a computer program, which when loaded onto a computer to operate as an image identification apparatus falls within the scope of the present invention. Similarly a computer program which represents instructions in accordance with the method of identifying images falls within the scope of the present invention.

We claim:

1. An image identification apparatus for identifying an image from a hand drawn representation of at least part of said image, the image identification apparatus comprising:

an image processor arranged in operation to generate a reference identification in response to spatial samples produced from at least part of said hand drawn representation, said reference identification being indicative of a first estimate of which of a plurality of pre-stored images corresponds to said hand drawn representation, a control processor which is arranged in operation to cause said image processor to generate a refined reference identification from said spatial samples and further spatial samples produced from a further part of said hand drawn representation, said refined reference identification being indicative of a refined estimate of which of said plurality of pre-stored images corresponds to said hand drawn representation, and a data store coupled to said image processor and to said control processor, which serves to store at least one of said spatial samples and said further spatial samples, wherein said control processor is arranged in operation to feed at least one of said spatial samples and said further spatial samples to said image processor to generate said refined reference identification, said control processor is arranged to receive a trigger signal generated in response to said at least part of said hand drawn representation being generated and said further part of said hand drawn representation being generated, and said control processor being arranged in operation to communicate at least one of said spatial samples and said further spatial samples to said image processor in response to said trigger signal, so as to enable said refined reference identification to be generated.

2. An image identification apparatus as claimed in claim 1, comprising
a drawing processor having a drawing tool for use in creating said hand drawn representation of said image, wherein said spatial samples and said further spatial samples are generated in accordance with movement of said drawling tool.

3. An image identification apparatus as claimed in claim 4, wherein a trigger signal is provided by said drawing processor.

4. An image identification apparatus as claimed in claim 5, wherein said drawing tool has a pen means and a drawing surface, said trigger signal being generated by said drawing processor when said pen is substantially removed from said drawing surface.

5. An image identification apparatus as claimed in claim 1, comprising
a clock coupled to said control processor, which serves to provide a temporal reference from which a predetermined time lapse from when said spatial samples and said further spatial samples were produced can be measured, wherein said control processor is arranged in combination with said image processor to generate at least one of said reference identification and said refined reference identification in response to said pre-determined time lapse.

6. An image identification apparatus as claimed in claim 1, wherein said image processor comprises
a segment processor arranged in operation to determine from at least one of said spatial samples and said further spatial samples stroke data representative of strokes performed in drawing said hand drawn representation of said image,
a stroke pre-processor which is arranged in operation to generate parameter data by associating said sequence of spatial samples with said determined stroke data of said hand drawn representation, and
an image identifier coupled to said stroke pre-processor which is arranged in operation to generate said reference identification or said refined reference identification trout said parameter data.

7. An image identification apparatus as claimed in claim 1, comprising
a visual display means coupled to said control processor, wherein said data store is arranged to store said plurality of pre-stored images, and said control processor is arranged in operation to retrieve from said data store image data representative of said image which corresponds to said hand drawn representation in accordance with at least one of said reference identification and said refined reference identification, and to display said image data on said visual display means.

8. An image identification apparatus as claimed in claim 1, comprising
a user interface device coupled to said control processor and arranged in operation to provide an indication from said user as to whether or nor the corresponding image is in accordance with the hand drawn representation, wherein said corresponding image is saved in response to said user indication.

9. An image identification apparatus as claimed in claim 8, wherein in response to said user indication, said data store is reset to receive spatial samples representative of a hand drawn representation of a further image.

10. An image identification apparatus as claimed in any of claim 8, wherein said user interface device is a computer mouse, said drawing tool, a keyboard or the like.

11. A method of identifying an image from a hand drawn representation of at least part of said image, the method comprising the steps of:
generating a reference identification from spatial samples produced in response to at least part of said hand drawn representation of said image, which reference indication is indicative of a first estimate of which of a plurality of pre-stored images corresponds to said hand drawn representation,
generating a refined reference identification from said spatial samples and further spatial samples produced from a further part of said hand drawn representation, said refined reference identification being indicative of a refined estimate of which of the plurality of pre-stored images corresponds to said hand drawn representation and said further parts of said hand drawn representation,
storing at least one of said spatial samples and said further spatial samples in a data store, wherein said re tined reference identification is generated from said spatial samples and said further spatial samples which have been stored in said data store, and
generating a trigger signal after each of said sequence of spatial samples and said further spatial samples have been received, wherein the steps of generating the reference indication and said refined reference indication are performed when said trigger signal is detected.

12. A method of identifying an image as claimed in claim 11, wherein said spatial samples and said further spatial samples are generated by a drawing processor having a drawing tool, said spatial samples being generated in accordance with movement of said drawing tool.

13. A method of identifying an image as claimed in claim 12, wherein said drawing tool has a pen means and a drawing surface, the step of generating said trigger signal comprises the step of
detecting if said pen means is substantially removed from said drawing surface, said trigger signal being generated in response to said pen means being substantially removed from said drawing surface.

14. A method of identifying an image as claimed in claim 12, comprising the step of
determining if a predetermined time has lapsed since said spatial samples or said further spatial samples were received, and if said predetermined time has lapsed without further spatial samples being received, performing at least one of the steps of generating said reference identification and said refined reference identification.

15. A method of identifying an image as claimed in claim 11, wherein the step of generating said reference identification and said refined reference identification comprises the steps of
resolving, from at least one of said spatial samples and said further spatial samples, strokes performed in creating said hand drawn representation of said image,
generating parameter data by associating at least one of said spatial samples and said further spatial samples with said resolved strokes of said hand drawn representation, said reference identification or said refined identification being determined from said parameter data.

16. A method of identifying an image as claimed in claim 11, comprising the steps of retrieving from said data store image data representative of an image corresponding to at least one of said reference identification and said refined reference identification from a plurality of images stored in said further data store, and representing said image data on a visual display means.

17. A method of identifying an image as claimed in claim 11, comprising the steps of generating an indication, under user control, that said image data is in accordance with said hand drawn representation, and saving said image in response to said user indication.

18. A method of identifying an image as claimed in claim 11, comprising the steps of emptying said data store in response to said user indication, and receiving new spatial samples which correspond to a new hand drawn representation of a further image.

19. A computer program arranged to define the steps of the method of identifying an image as claimed in claim 11.

20. A computer readable carrier having stored thereon a computer program which is arranged to perform the steps of the method of identifying an image as claimed in claim 11, when loaded on to a computer.

21. A computer which when loaded with the computer readable carrier according to claim 20 operates as an image identification apparatus.

* * * * *